(12) United States Patent
Juma

(10) Patent No.: US 11,615,167 B2
(45) Date of Patent: *Mar. 28, 2023

(54) MEDIA CREATION SYSTEM AND METHOD

(71) Applicant: Grupiks LLC, Chicago, IL (US)

(72) Inventor: Sam Juma, Chicago, IL (US)

(73) Assignee: Grupiks LLC, Chicago, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 17/140,647

(22) Filed: Jan. 4, 2021

(65) Prior Publication Data
US 2021/0124811 A1 Apr. 29, 2021

Related U.S. Application Data

(63) Continuation of application No. 16/510,039, filed on Jul. 12, 2019, now Pat. No. 10,915,606.

(60) Provisional application No. 62/699,386, filed on Jul. 17, 2018.

(51) Int. Cl.
G06F 16/30 (2019.01)
G06F 21/10 (2013.01)
G06F 16/95 (2019.01)
G06F 16/487 (2019.01)

(52) U.S. Cl.
CPC ............ *G06F 21/10* (2013.01); *G06F 16/487* (2019.01); *G06F 16/95* (2019.01); *G06F 2221/0713* (2013.01)

(58) Field of Classification Search
CPC ........ G06F 21/10; G06F 16/487; G06F 16/95; G06F 2221/0713
See application file for complete search history.

(56) References Cited

U.S. PATENT DOCUMENTS

| | | | |
|---|---|---|---|
| 7,072,733 B2* | 7/2006 | Magee ............... | D06B 11/0059 700/133 |
| 2008/0209502 A1* | 8/2008 | Seidel .................... | G06F 16/48 707/E17.014 |
| 2012/0233198 A1* | 9/2012 | Lanier ................... | G06F 16/954 707/769 |
| 2015/0296031 A1* | 10/2015 | Miyazaki ............... | G06F 16/00 709/204 |
| 2015/0378998 A1* | 12/2015 | Houh .................. | H04N 21/4828 707/706 |

* cited by examiner

Primary Examiner — Tyler J Torgrimson
(74) Attorney, Agent, or Firm — Nyman IP LLC; Scott Nyman

(57) ABSTRACT

A media creation system is provided for creating photographs and videos that include assets sourced from different geographic locations. The media creation system may parsing media, transposition the media, and/or perform additional modifications to the media. A method for creating photographs, videos, and live streams of one or more assets sourced from different geographic locations using the audio-visual media composition system is also provided.

20 Claims, 10 Drawing Sheets

MEDIA CREATION SYSTEM AND METHOD

CROSS-REFERENCE TO RELATED APPLICATION

This application claims the priority from U.S. nonprovisional patent application Ser. No. 16/510,039 filed Jul. 12, 2019, which claims the benefit of and claims priority to U.S. provisional patent application Ser. No. 62/699,386 filed Jul. 17, 2018. The foregoing applications are incorporated in its entirety herein by reference.

FIELD OF THE INVENTION

The present disclosure relates to a system to create media from photographs and other media. More particularly, the disclosure relates to creating photographs, videos, and live streams of one or more assets sourced from different geographic locations.

BACKGROUND

People enjoy capturing and sharing memories with each other. However, often multiple people cannot take a photograph or video together due to physical distance between them. The cost of constantly traveling to distant locations to visit friends, family, and others just to share a photograph can be prohibitively expensive.

Additionally, companies and news crews often must send reporters and other personnel to a location to get a desired shot. Some existing techniques might be used with green screens to simulate being at a location, but these require specialized setups not accessible to most people. Such known methods lack the ability to have multiple parties interact in a substantially live photography or video product while being physically in different locations.

Therefore, a need exists to solve the deficiencies present in the prior art. What is needed is a system to create common photographs with multiple people from different locations. What is needed is a system to create and display common photographs with multiple people from different locations substantially on demand. What is needed is a system to parse multiple photographs for assets to transpose into a common photograph. What is needed is a system to parse multiple video sources for assets to transpose into a common video source. What is needed is a system to parse multiple video sources for assets to transpose into a common video source substantially live. What is needed is a method of creating an audiovisual product using assets sourced from multiple geographic locations.

SUMMARY

An aspect of the disclosure advantageously provides a system to create common photographs with multiple people from different locations. An aspect of the disclosure advantageously provides a system to create and display common photographs with multiple people from different locations substantially on demand. An aspect of the disclosure advantageously provides a system to parse multiple photographs for assets to transpose into a common photograph. An aspect of the disclosure advantageously provides a system to parse multiple video sources for assets to transpose into a common video source. An aspect of the disclosure advantageously provides a system to parse multiple video sources for assets to transpose into a common video source substantially live. An aspect of the disclosure advantageously provides a method of creating an audiovisual product using assets sourced from multiple geographic locations.

A system enabled by this disclosure may bring people together from all over the world. People love taking selfies or being together in videos with friends and family members. An application or system enabled by this disclosure may allow multiple people to take pictures, record videos, and converse live together with each person in a different location. The system enabled by this disclosure may allow video clips of pictures to be put together to share with family and friends. Pictures can be taken at famous landmarks without being there and with multiple people from different locations in the picture.

Accordingly, the disclosure may feature a media creation system that includes a media parsing component, a transposition component, and a communication component. The media parsing component may be a software module configured to operate on at least one computerized device comprising a processor and a storage medium storing instructions operable, when executed by the computerized device, to cause one or more computers to derive parsed assets from source media and store the parsed assets in memory. The source media may include at least a first source media created by a first user from which a first parsed asset is derived, and a second source media created by a second user from which a second parsed asset is derived.

The transposition component may be a software module configured to operate on the at least one computerized device to cause the one or more computers to organize the parsed assets in the memory and compose an output media product comprising each of the parsed assets without the parsed assets being combined with one another beyond being presented in the same output media product. The communication component may be a software module configured to operate on the at least one computerized device to cause the one or more computers to share at least the output media product with a recipient party via a network when the processor completes processing the output media product and without intentional delay.

In another aspect, the transposition component may at least partially modify the parsed assets to simulate being originated from a common source medium prior to being transposed into the output media product. The output media product may simulate at least the first parsed asset and the second parsed asset being originated from the common source medium. The output media product may simulate being originated from the common source medium with the parsed assets present at a shared location.

In another aspect, the system may include a permissions component being a software module configured to operate on the at least one computerized device and comprising permission rules. The permissions component may allow access to at least the output media product to the recipient party in compliance with the permission rules.

In another aspect, the system may include a database communicably connected to the communication component via the network. The output media product may be storable by the communication component in the database via the network. The output media product may be retrievable by the recipient party from the database via the network.

In another aspect, the system may include global assets storable in the database. The global assets may be selectively included with the parsed assets to compose the output media product.

In another aspect, the global assets may include a location background layer.

In another aspect, the system may include a camera component to originate the source media. The source media originated by the camera component may be stored in the memory to be retrieved by the media parsing component.

In another aspect, the first source media may be originated from a first geographic location comprising the first parsed asset. The second source media may be originated from a second geographic location comprising the second parsed asset. The transposition component may analyze the first parsed asset and the second parsed asset. The transposition component may compose the output media product to comprise the first parsed asset and the second parsed asset.

In another aspect, the source media may include an image.

In another aspect, the source media may include video and audio.

In another aspect, the video and the audio may be captured without intentional delay. The video and the audio may be processed by the processor upon receipt. The output media product may be shared with the recipient party when the processor completes processing the video and the audio and without intentional delay.

Accordingly, the disclosure may feature a media creation system to include a media parsing component, a transposition component, a permissions component, and a database. The media parsing component may be a software module configured to operate on at least one computerized device comprising a processor and a storage medium storing instructions operable. When executed by the computerized device, the media parsing component may cause one or more computers to derive parsed assets from source media and store the parsed assets in memory. The source media may include first source media comprising a first asset, and second source media comprising a second asset.

The transposition component may be a software module configured to operate on the at least one computerized device to cause the one or more computers to organize the parsed assets in the memory upon receipt of the parsed assets from the media parsing component and compose an output media product comprising each of the parsed assets without the parsed assets being combined with one another beyond being presented in the same output media product. The permissions component may be a software module configured to operate on the at least one computerized device and comprising permission rules. The database may be accessible via a network.

The output media product may be storable in the database. The transposition component may perform the steps of: (a) analyzing the first asset and the second asset, (b) composing the output media product to comprise the first asset and the second asset, and (c) at least partially modifying the first asset and/or the second asset to simulate being originated from a common source medium prior to being transposed into the output media product. The output media product may simulate being originated from the common source medium with at least the first asset and the second asset present at a shared location. The permissions component may allow access to at least the output media product to a recipient party in compliance with the permission rules. The output media product may be retrievable by the recipient party in compliance with the permission rules from the database when the processor completes processing the output media product and without intentional delay.

In another aspect, the system may include global assets storable in the database. The global assets may be includable with the parsed assets to compose the output media product.

In another aspect, the system may include a camera component to originate the source media. The source media originated by the camera component may be stored in the memory to be retrieved by the media parsing component.

In another aspect, the system may include a communication component being a software module configured to operate on the at least one computerized device to cause the one or more computers to share at least the output media product with the recipient party via the network when the processor completes processing the output media product and without intentional delay. The database may be communicably connected to the network via the communication component.

Accordingly, the disclosure may feature a method of composing an output media product using parsed assets. The method may include (a) deriving the parsed assets from source media and storing the parsed assets in memory. The source media may include at least a first source media from which a first parsed asset is derived and a second source media from which a second parsed asset is derived. The method may include (b) organizing the parsed assets in the memory and composing an output media product comprising the parsed assets. The method may include (c) a least partially modifying the parsed assets to simulate being originated from a common source medium prior to being transposed into the output media product. The method may include (d) sharing at least the output media product with a recipient party over a network when processing of the output media product completes and without intentional delay. The output media product may simulate being originated from the common source medium by simulating the parsed assets being present at a shared location.

In another aspect, the method may include (e) allowing access to at least the output media product to the recipient party in compliance with permission rules.

In another aspect, the method may include (f) storing the output media product in a database via the network. The method may include (g) retrieving the output media product by the recipient party from the database. Global assets may be storable in the database. The global assets may be includable with the parsed assets to compose the output media product.

In another aspect, the source media may include first source media originated at a first geographic location comprising a first asset and second source media originated at a second geographic location comprising a second asset. The method may include (h) analyzing the first asset and the second asset. The method may include (i) composing the output media product to comprise the first asset and the second asset as the parsed assets without the parsed assets being combined with one another beyond being presented in the same output media product. The method may include (j) at least partially modifying the first asset and/or the second asset to simulate being originated from the common source medium prior to being transposed into the output media product.

In another aspect, the output media product may include images.

Terms and expressions used throughout this disclosure are to be interpreted broadly. Terms are intended to be understood respective to the definitions provided by this specification. Technical dictionaries and common meanings understood within the applicable art are intended to supplement these definitions. In instances where no suitable definition can be determined from the specification or technical dictionaries, such terms should be understood according to their plain and common meaning. However, any definitions provided by the specification will govern above all other sources.

Various objects, features, aspects, and advantages described by this disclosure will become more apparent from the following detailed description, along with the accompanying drawings in which like numerals represent like components.

DETAILED DESCRIPTION

Figure 1:
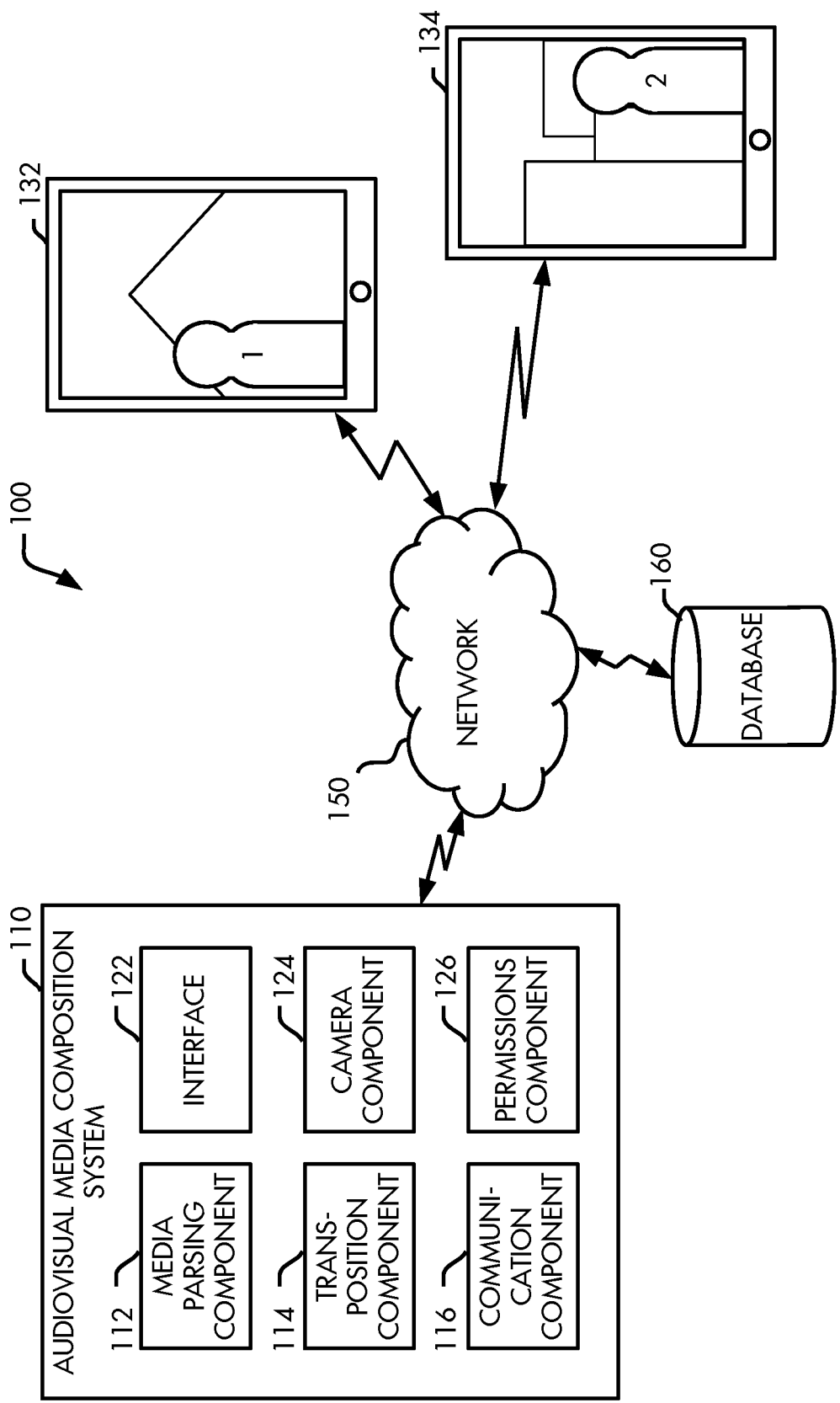
FIG. 1 is a block diagram view of an illustrative audiovisual media composition system, according to an embodiment of this disclosure.

The following disclosure is provided to describe various embodiments of an audiovisual media composition system. Skilled artisans will appreciate additional embodiments and uses of the present invention that extend beyond the examples of this disclosure. Terms included by any claim are to be interpreted as defined within this disclosure. Singular forms should be read to contemplate and disclose plural alternatives. Similarly, plural forms should be read to contemplate and disclose singular alternatives. Conjunctions should be read as inclusive except where stated otherwise.

Expressions such as "at least one of A, B, and C" should be read to permit any of A, B, or C singularly or in combination with the remaining elements. Additionally, such groups may include multiple instances of one or more element in that group, which may be included with other elements of the group. All numbers, measurements, and values are given as approximations unless expressly stated otherwise.

For the purpose of clearly describing the components and features discussed throughout this disclosure, some frequently used terms will now be defined, without limitation. The term photography, as it is used throughout this disclosure, is defined as a picture captured from a camera device, being analog and/or digital, to preserve a snap shot of a moment. Unless specifically stated, embodiments discussed throughout this disclosure that apply to photography are intend to additional apply to video and/or other audiovisual media. The terms parsing and parsed, as used throughout this disclosure, is defined as extracting information from source media and/or data. The term transposition, as it is used throughout this disclosure, is defined as the combination of multiple assets to assist in generating a output photography product. The term asset, as it is used throughout this disclosure, is defined as a discernable element included in a photograph, video, and/or other audiovisual medium. Assets may include persons of interest, background scenery, and other identifiable elements. The term derive is defined as to take, receive, or obtain especially from a specified source. The term compose is defined as to form by putting together and/or to arrange in proper or orderly form.

Various aspects of the present disclosure will now be described in detail, without limitation. In the following disclosure, an audiovisual media composition system will be discussed. Those of skill in the art will appreciate alternative labeling of the audiovisual media composition system as a photography combination application, audiovisual media transposition system, audiovisual media application, audiovisual media parsing and transposition system, the invention, or other similar names. Similarly, those of skill in the art will appreciate alternative labeling of the audiovisual media composition system as an audiovisual media parsing and transposition operation, video parsing and transposition operation, media combination method, method, operation, the invention, or other similar names. Skilled readers should not view the inclusion of any alternative labels as limiting in any way.

Referring now to FIGS. 1-16, including block diagram 100 of FIG. 1, the audiovisual media composition system will now be discussed in more detail. The audiovisual media composition system 110 may include a media parsing component 112, transposition component 114, communication component 116, interface aspects 122, optional camera component 124, permissions component 126, and/or additional components that will be discussed in greater detail below. The audiovisual media composition system 110 may operate one or more of these components interactively with other components for creating audiovisual media products such as photographs, videos, and live streams using one or more assets sourced from various source media, which may have been created in different geographic locations. The audiovisual media composition system 110 may be communicably connected to external computing devices, such as smartphones 132, 134, databases 160, servers, and/or other aspects via a network 150, without limitation.

This disclosure generally relates to composing audiovisual media products, such as photography and/or video products, with assets derived from multiple source media, which may be taken from various source locations. The product of the audiovisual media composition system 110 will be referred to throughout this disclosure as an output media product, without limitation.

Ideally, a system enabled by this disclosure may help create output media products, such as photography and/or video products, by incorporating multiple people or other assets, which may be sourced from different geographic locations, in a common output media product. The audiovisual media composition system 110 may physically and/or virtually include one or more camera component 124 to generate source media, the media parsing component 112 to parse the source media and identify parsed assets to be combined for making the output media product, the communication component 116 for transferring data over a network, and the transposition component 114 to condition the sourced assets and create the output media product. Additional components may be physically and/or virtually included, for example, the interface 122 to control aspects of the composition and view the created output media products, the permissions component 126 to select which recipient parties are authorized to view the sourced media, parsed assets, output media product, and/or other information. The audiovisual media composition system 110 may additionally locally and/or virtually include features to view the assets and final composed photography, video, and/or other media output products.

A system enabled by this disclosure may also be adapted to work with video and/or substantially live sources and assets. For the purpose of this disclosure, terms "live" and "real time" are intended to include processing delays incurred by digitally analyzing and otherwise interacting with the data used to parse source media, condition parsed assets, transpose the parsed assets into the output media product, and electronically transmit data relating to the same. Final photos and/or videos may be shared with authorized recipient parties or, if permitted by a user, the public.

The camera component will now be discussed in greater detail. FIGS. 1-9 highlight examples of the camera component 124, which may also be shown in other figures. The camera component 124 may include one or more hardware and/or software features to originate the source media. For example, the camera component 124 may include features to interact with the camera hardware included on a mobile computing device, such as a smartphone 132, 134. In another embodiment, the camera component 116 may interact with a studio-grade camera. Multiple cameras may be communicably connected via a network 150, each of which may communicate data with the camera component 124 to facilitate creating the output media product.

In one embodiment, the source media originated by one or more cameras communicably connected to the camera component 124 may be stored in the memory to be retrieved by the media parsing component 112 and/or other components of this disclosure. In one embodiment, the memory may include random access memory operatively connected to a computer processor. In additional embodiments, memory may include flash memory, storage memory, and/or other structures for temporary and/or longer-term data storage, as would be understood by a person of skill in the art after having the benefit of this disclosure.

In one embodiment, the camera component 124 may include features to determine the geographic location of a user, such as by GPS and/or triangulation. Multiple cameras may be used to capture source media, such as photographs and/or video, of multiple users and/or locations that include assets that can be used to compose the output media product.

In some embodiments, the camera component 124 may include specialized hardware to detect additional features of a target image and assist with parsing and subject identification, which may be at least partially performed by the media parsing component 112. For example, a camera component may include multiple lenses to detect a depth of the subject being photographed. At least part of the depth information may be used to assist in determining which part of a captured image and/or video should be considered to become a parsed asset and which parts should be disregarded, for example, as being included the background layer of the source media.

In one embodiment, the camera component may operate in or with a viewfinder to control an external camera. For example, a device may be installed in a viewfinder and/or used as a viewfinder or controller for a professional camera studio setup accepting input via wireless or wired connections. Some applications that could be utilized are movie, game development, motion capture, or broadcast production, music videos, digital greenscreen effects, digital sets, digital set elements, and additional applications that will be appreciated by a person of skill in the art after having the benefit of this disclosure.

The media parsing component will now be discussed in greater detail. FIGS. 1-5 highlight examples of the media parsing component, which may also be shown in other figures. In one embodiment, the media parsing component 112 may derive parsed assets from source media, for examples, subject people detected in source photographs and/or video files. The parsed assets may be stored in memory for use by other components. The source media may be produced from a camera, such as a camera communicably connected to the camera component 124. For example, the source media originated by the camera component may be stored in the memory to be retrieved by the media parsing component 112.

The media parsing component 112 may derive one or more assets from a photograph and/or video captured by the camera component 124. The media parsing component 112 may detect backgrounds, faces, body outlines, heads, and other parts of a subject to be incorporated into the output media product. The media parsing component 112 may also detect objects or other subject matter, as may be defined by the application through which a system enabled by this disclosure is operated. Additionally, the media parsing component 112 may capture a background layer or setting to be used with composing the output media product. The media parsing component 112 may include routines based on artificial intelligence, machine learning, or pattern recognition to assist with detecting usable assets from the source photograph and/or video captured by the camera component 124. The analysis performed by the media parsing component 112 may be performed on a remote server connected with the other components of this system via a network 150, for example, the Internet.

In one embodiment, the asset detection operation may benefit from applying a machine learning approach. For example, multiple passes of the asset detection may be performed on various source images and/or videos. These multiple passes may be performed on a same image and/or multiple different images with shared qualities. A feedback loop may be provided to grade the efficacy of asset detection. Techniques the return errors or have a low efficacy may be devalued and techniques producing high efficacy asset detection may be promoted. Similar approaches may be applied to extending the detection of a face a head and/or body of a subject as an asset.

In one embodiment, the source media to be parsed by the media parsing component 112 may use multiple source media. For example, the source media may include a first source media originated at a first geographic location comprising a first asset and a second source media originated at a second geographic location comprising a second asset. Skilled artisans will appreciate additional source media may be included, which may be originated from additional geographic locations and comprise additional assets, without limitation.

Parsed assets may be stored in memory to be used by other components, for example, the transposition component 114 to analyze the parsed assets. Various assets parsed from source media taken by one or more cameras from one or more geographic locations may be collectively stored as parsed assets. The transposition component 114 may assist with composing the output media product to include the parsed assets, which may have been identified by the media parsing component 112 as the first asset, the second asset, and/or additional assets.

The media parsing component 112 may facilitate extracting desired assets from source media. Once a subject of interest is identified in source media, it may be extracted as assets, for example a first asset or a second asset, by the media parsing component. In one embodiment, the media parsing component 112 may identify humans as assets directly from the source media.

The transposition component will now be discussed in greater detail. FIGS. 1 and 4-9 highlight examples of the transposition component, which may also be shown in other figures. The transposition component 114 may modify and/or combine one or more parsed assets, such as may be derived by the media parsing component 112, in an output media product. For example, the transposition component 114 may combine the likenesses of multiple people and a selected background to create an output media product that appears to have been taken in one shot from a common source medium with all included people present. This operation may be especially advantageous, as an output media product such as a photograph and/or video may be produced that simulates all members being present at a shared location even though the original photos of the people were taken at different places and/or times.

The transposition component 114 may analyze assets parsed from various photographs to prepare the assets for composition and/or merging. If the source media includes people of at different levels of zoom or otherwise misconfigured, the transposition component may match the scale, color, brightness, or other qualities to simulate shared conditions. This image modification may advantageously create a finished photography and/or video product with substantially convincing results.

The transposition component 114 may assist with organizing parsed assets in the memory and composing an output media product that includes at least the parsed assets. The output media product may additionally include a background layer, which may be provided by the source media, global media such as may be stored in a database 160 connected via the network 150, or elsewise provided. The transposition component 124 may at least partially modify the parsed assets to simulate being originated from a common source medium prior to being transposed into the output media product.

In one embodiment, the transposition component 114 may include global assets with the parsed assets when creating the output media product. Global assets may be stored in and/or retrieved from a database 160, without limitation. Examples of global assets may include stored persons, stock background locations, famous figures, and other assets that may be included in the output media product. The global assets may be includable with the parsed assets to compose the output media product. In one embodiment, the global assets may include a location background layer onto which the parsed people may be imposed upon.

In one embodiment, the transposition component may at least partially modify a first asset originated from a first source media and/or the second asset originated from a second source media to simulate being originated from the common source medium prior to being transposed into the output media product. The transposition component may perform this modification prior to the assets being transposed into the output media product.

In one embodiment, the transposition component 114 and/or other components of an audiovisual media composition system 110 enabled by this disclosure may create an output media product and share the output media product with a permitted recipient party approximately in real time having a minimal processing dely. Examples of possible approximately real time delays in various embodiments may include in seconds: 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.5, 4.0, 4.5, 5.0, 6, 7, 8, 9, 10, and other durations that would be appreciated by a person of skill in the art after having the benefit of this disclosure.

The transposition component 114 may modify one or more of the parsed assets to improve consistence among the assets with the goal of imitating each parsed asset appearing as if it was originally captured on common source media. For example, the transposition component 114 may alter characteristics relating to zoom, centering, cropping, focus, lighting, color, echo, reverberation, and other characteristics associated with audiovisual media that would be appreciated by a person of skill in the art after having the benefit of this disclosure. For example, the transposition component 114 may modify lighting appearance, reflections, brightness, and other aspects. In low light situations, the transposition component 114 may attempt to capture source media with a flash and without to computationally merge the audiovisual media.

The transposition component 114 may additionally apply computational zoom to adjust the sizing of parts or all of a parsed asset after its source media has been captured. Additionally, computational camera processing may be applied to electronically change the camera's perspective for the output media product. Multiple images may be blended into a single image, with details from each of the multiple images being used to construct the final image. This may additionally apply to frames of video.

The transposition component 114 may normalize color of parsed assets to increase consistency when included in the output media product. For example, color science normalization may be applied across different device's cameras to increase the likelihood of the merged output media product having uniform color tones. Raytracing of digital objects may also be performed to create photo realistic digital objects. Raytracing may further enhance the parsed assets to incorporate virtually photo-realistic graphics into the audiovisual media. In an additional embodiment, rasterization may be used to create 3D models via polygons, which may be altered and positioned when creating the output media product.

The transposition component 114 may clean up shadows and/or adding a virtual backlight source. Audio may also be cleaned up and modified using techniques such as noise removal, equalization, and/or other techniques that would be appreciated by those of skill in the art to isolate and remove pops, hiss, cracks, and other undesirable noises from assets parsed from source media. Merging and layering techniques may be used for audio tracks. Sound normalization and cleanup may be employed for merged audiovisual output, which may be accomplished using synced multi-channel audio.

The transposition component 114 may include post processing tools to modify existing audiovisual media. For example, multiple instances or versions of source audiovisual media may be provided to the system and/or parsed by the media parsing component 112. With enough audiovisual media perspectives considered, the scene may be computationally stitched together to understand the depth and placement in the real world and allow the user to be able to click into and select a zoomed image.

The communication component will now be discussed in greater detail. FIG. 1 highlight examples of the communication component, which may also be shown in other figures. The system may include a communication component 116 to facilitate transmission of data between a device including the camera component, the media parsing component 112, the transposition component 114, target user devices 132, 134, interfaces 122, and/or other components and features associated with the system. One or more of the components may be located on a common server, for example, the media parsing component 112 and/or transposition component 114.

In one example, the database 160 may be communicably connected to the transposition component 114 via the network 150. The communication may be facilitated by the communication component 126. The output media product produced by the transposition component 114 may be storable by the communication component 116 in the database 160. The output media product may be retrievable by the recipient party from the database 160.

In one example, photography and/or video source media taken from the cameras of each user to be combined to make the output media product may be communicated via the communication component 116 to the media parsing component 112. The media parsing component 112 may be included on a remote server, for example, an elastic web server, and receive photograph source material via the communication component 116. After the image or other source media has been parsed and the assets from the images derived, the assets may be communicated to the transposition component 114 for modification and/or assembly of the output media product. The output media product may then be communicated to one or more of the users, or if permitted by the permission component 126, the public, via the communication component 116.

The communication component 116 may additionally assist with the sharing and distribution of output media products created by a system enabled by this disclosure. For example, a system may share copies of the output media product after production to the people included in the output media product. In another example, the communication component 116 may allow a user to share the output media product via social media, publicly accessible repositories, media outlets, or other content distribution platforms that would be appreciated by a person of skill in the art after having the benefit of this disclosure.

The interface aspects will now be discussed in greater detail. FIGS. 1-9 highlight examples of the interface aspects, which may also be shown in other figures. The interface 122c may include features to assist users with taking a photograph and/or video in such a way that it may be more easily parsed and thus the assets from which may be more easily transposed into an output media product. The interface 122 may include guidance for the user, features to facilitate sharing and public distribution, and other aspects that could assist with operation of a system enabled by this disclosure.

In one embodiment, the interface 122 may include an initial screen secure login. The login screen may permit using of shared credentials, such as those associated with Google, Facebook, email, or others. The user may be given an option to import a list of contacts and/or manage a friends list to show other users of the app and their login status. Live chat may be included to coordinate with other users.

In an illustrative interface, audiovisual media application functionality may include a top row of common functions. An illustrative function my include a timer to allow the user to set a timer so that the audiovisual media capture may start on a delay. An illustrative function my include a format option to select the format of the audiovisual media. For example, a capture size of 16:9 or 4:3 may be selected for file format to output. An illustrative function my include a subject selector, which may instruct the camera to allow the user to select the subject of the source media to be captured.

An illustrative function my include a background selector for the camera that may allow the user to select the background in the viewfinder or source media. A pinch-to-zoom control may be provided for the optical and digital zoom process. Focus for the camera on-touch of the object/subject on the screen may also be provided. Additional features may include, without limitation, a camera selector to change the camera used to capture from front camera to back camera and/or a record/capture button to initiate capture of the source media.

The permissions component will now be discussed in greater detail. FIG. 1 highlights examples of the permissions component 126, which may also be shown in other figures. The permissions component may analyze permission rules to determine whether a requested sharing operation is in compliance with the permission rule. Sharing requests that are in compliance with the permissions rules may be granted. Conversely, sharing requests that are not in compliance with the permission rules may be denied.

The permissions rules may be stored in the database 160, which may be communicably connected to the other components via the network. The permissions component 126 may manage, defined, control, set, and/or be manipulated by a user. For example, a person taking a photograph to be combined with another photograph may define permissions regarding how that photograph may be shared, ownership of rights in the photograph, how the photograph is distributed, and other aspects related to ownership of and/or access to the photography and/or video output media product.

Referring now to FIGS. 2-9, a series of illustrative source media parsing and transposition procedures will be discussed as examples, without limitation. Skilled artisans will appreciate the following examples may additionally apply to photo, audio, video, and live source media.

Figure 2:
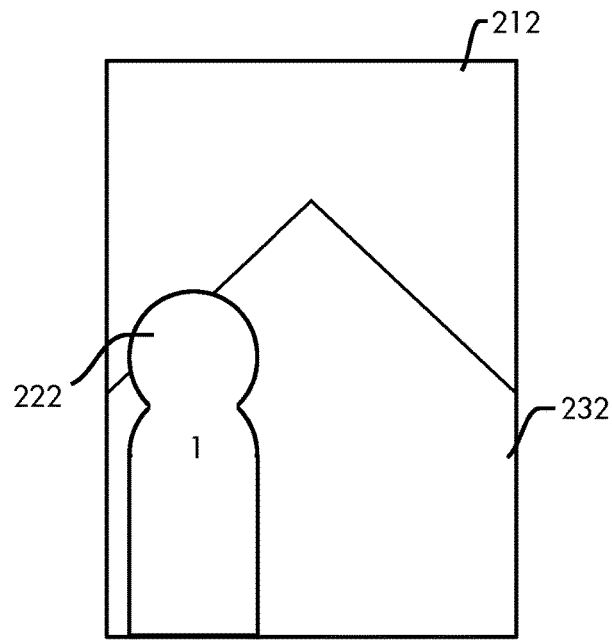
FIGS. 2-3 are diagrammatic views of illustrative source media, according to an embodiment of this disclosure.

The source media 212 shown in FIG. 2 includes a first asset 222 to be detected by the media parsing component. A first background layer 232 is also included. This photo may be captured at a first geographic location.

Figure 3:
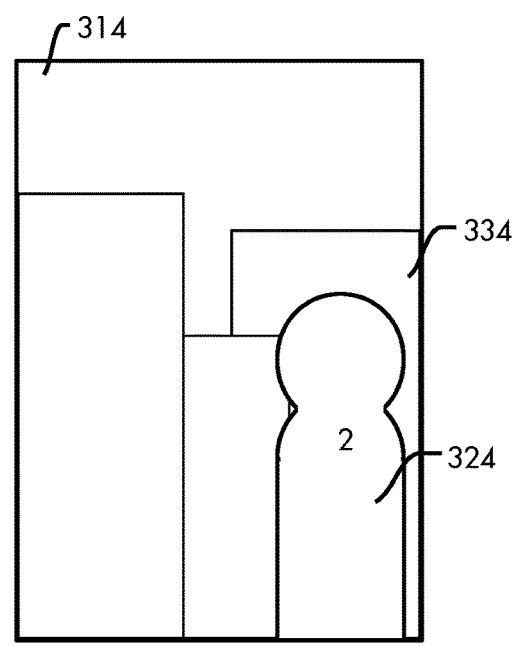

The source media 314 shown in FIG. 3 includes a second asset 324 to be detected by the media parsing component. A second background layer 334 is also included. This photo may be captured at a second geographic location.

Figure 4:
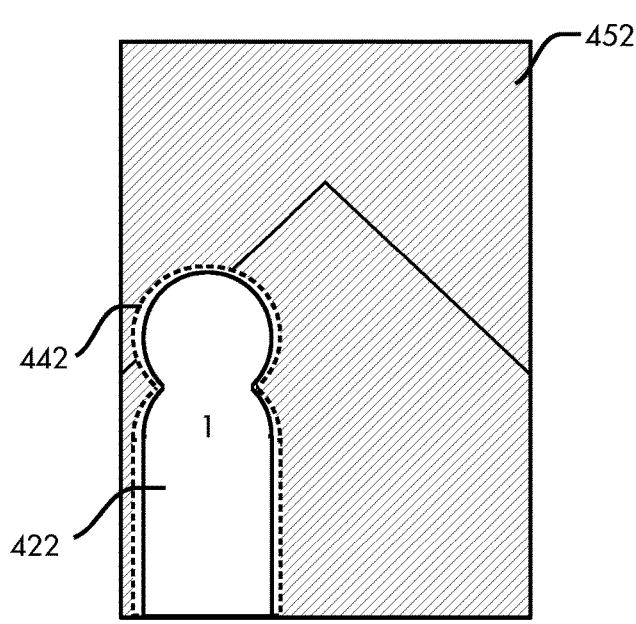
FIGS. 4-5 are diagrammatic views of illustrative parsed assets from source media, according to an embodiment of this disclosure.

Referring to FIG. 4, an example of the media parsing component determining the features of the captured first source media and distinguishing the first asset 422 from the first background layer 452 is illustrated. A cropping border 442 may be applied around the first asset to be captured. Once parsed, the first asset may be included as one of the parsed assets.

Figure 5:
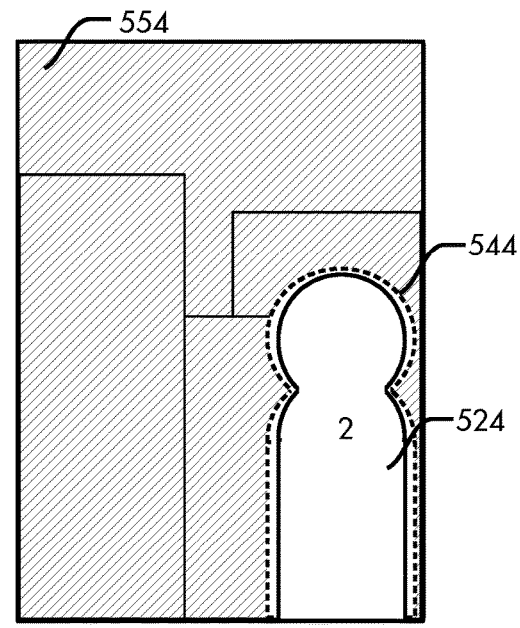

Referring to FIG. 5, an example of the media parsing component determining the features of the captured second source media and distinguishing the second asset 524 from the second background layer 554 is illustrated. A cropping border 544 may be applied around the second asset to be captured. Once parsed, the second asset may be included as one of the parsed assets.

Figures 6, 7:
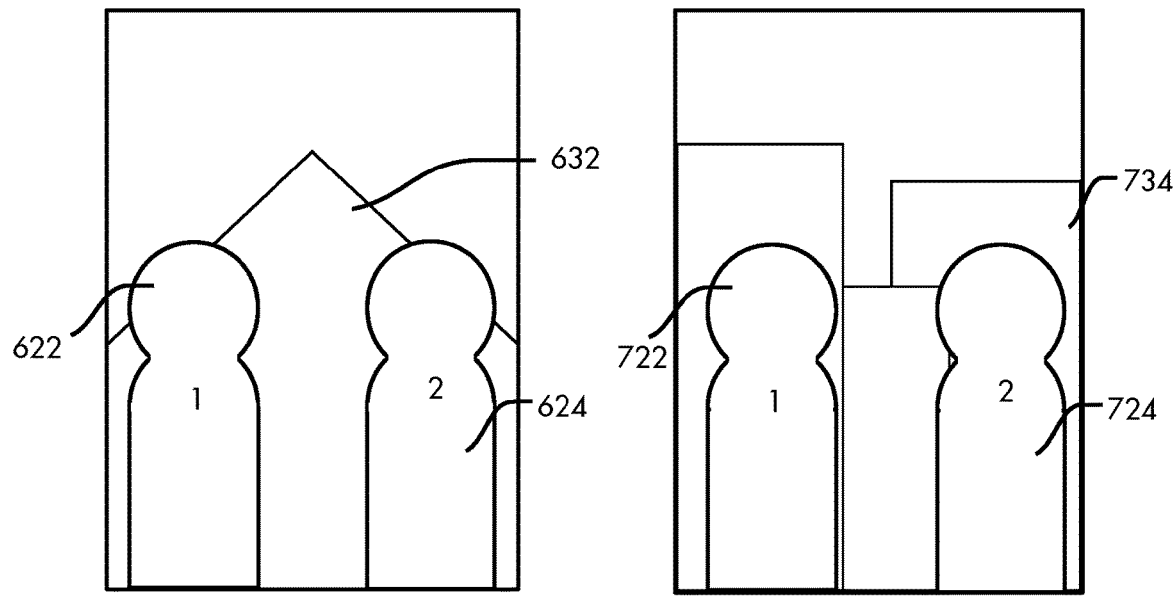
FIGS. 6-7 are diagrammatic views of media including transposed assets, according to an embodiment of this disclosure.

Referring to FIG. 6, the user may determine which background layer should be used for the resulting output media product, as may be performed by the transposition component. For example, the second asset 624 may be transposed onto the first image having the first asset 622 and the first background layer 632.

Referring to FIG. 7, the user may alternatively determine which background layer should be used for the resulting output media product, as may be performed by the transposition component. For example, the first asset 722 may be transposed onto the second image having the second asset 724 and the second background layer 734.

Figures 8, 9:
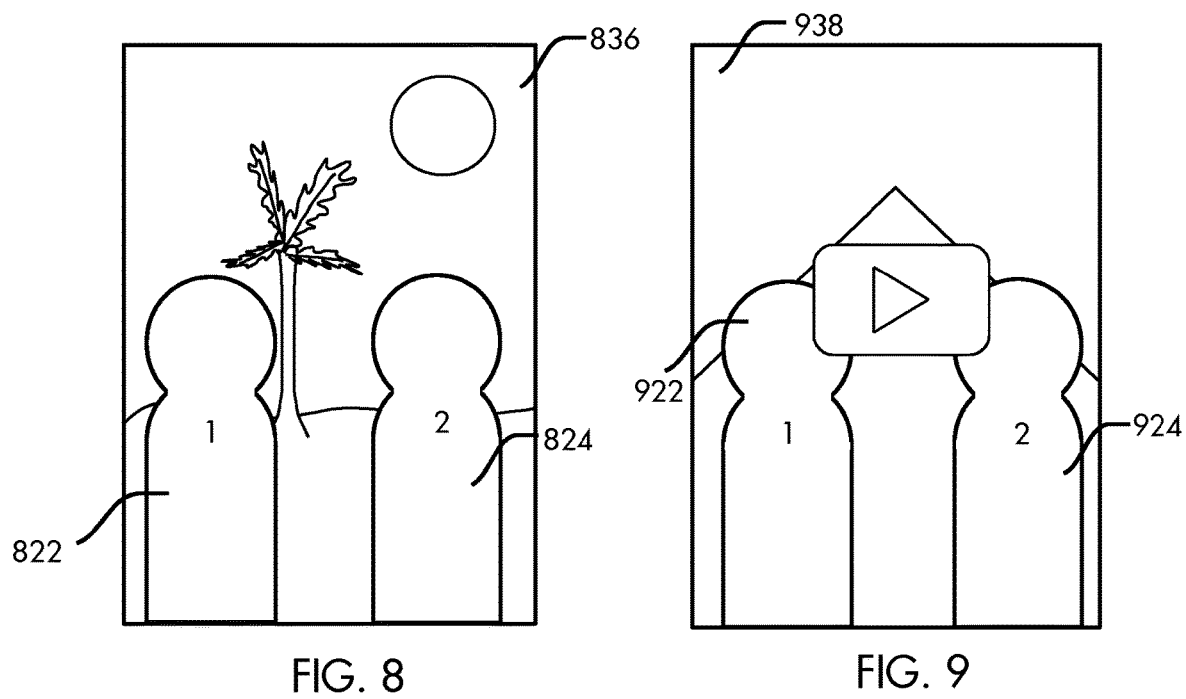
FIG. 8 is a diagrammatic view of an output media product including a global asset, according to an embodiment of this disclosure.
FIG. 9 is a diagrammatic view of an output media product including a video, according to an embodiment of this disclosure.

In a further example, the first asset 822 and second asset 824 may be transposed onto a unique background layer 836 provided by a global asset, simulating that both people were together at a shared location, as shown in FIG. 8.

These transposition operations may additionally be performed using video sources. For example, a first video asset 922 and second video asset 924 may be transposed onto a video background layer 938, such as the video background of one of the source media or as provided by a global asset, simulating that both people were together at a shared location, as shown in FIG. 9.

In one embodiment, the operation of a system enabled by this disclosure may be performed substantially live. For example, the image may be captured by the camera component, the assets defined by the media parsing component, and the photography and/or video product being created by the transposition component substantially in real time. For the purpose of this disclosure, skilled artisans will appreciate the term "real time" to include an acceptable but small delay and not require instantaneous processing.

Assets, including parsed assets and assets stored in 3D renders, source media files, output media products, and other data may be store in one or more file formats, without limitation. For example, the following file formats may be used for storing 3D parsed assets created from the media parsing component analyzing source media, without limitation: STL; OBJ; for ASCII and/or binary variants; FBX; COLLADA; 3DS; IGES; STEP; VRML; X3D; and other formats that would be appreciated by a person of skill in the art after having the benefit of this disclosure.

Illustrative video file formats may include, but are not limited to, AVI, FLV, WMV, MKV, MOV, MP4, and/or other formats that would be appreciated by a person of skill in the art after having the benefit of this disclosure.

Figure 10:
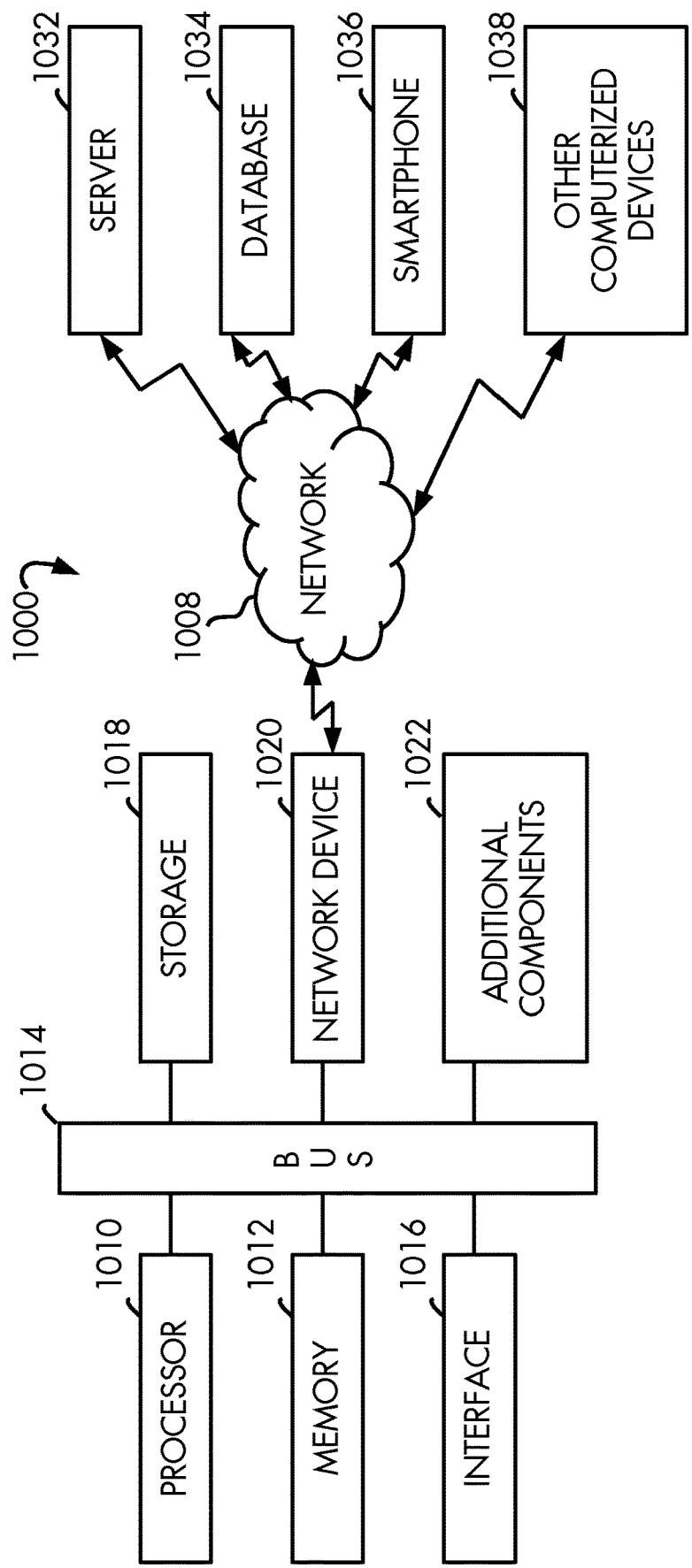
FIG. 10 is a block diagram view of an illustrative computerized device on which one or more components of this disclosure may be operated, according to an embodiment of this disclosure.

Referring now to FIG. 10, an illustrative computerized device will be discussed, without limitation. Various aspects and functions described in accord with the present disclosure may be implemented as hardware or software on one or more illustrative computerized devices 1000 or other computerized devices. There are many examples of illustrative computerized devices 1000 currently in use that may be suitable for implementing various aspects of the present disclosure. Some examples include, among others, network appliances, personal computers, workstations, mainframes, networked clients, servers, media servers, application servers, database servers and web servers. Other examples of illustrative computerized devices 1000 may include mobile computing devices, cellular phones, smartphones, tablets, video game devices, personal digital assistants, network equipment, devices involved in commerce such as point of sale equipment and systems, such as handheld scanners, magnetic stripe readers, bar code scanners and their associated illustrative computerized device 1000, among others. Additionally, aspects in accord with the present disclosure may be located on a single illustrative computerized device 1000 or may be distributed among one or more illustrative computerized devices 1000 connected to one or more communication networks.

For example, various aspects and functions may be distributed among one or more illustrative computerized devices 1000 configured to provide a service to one or more client computers, or to perform an overall task as part of a distributed system. Additionally, aspects may be performed on a client-server or multi-tier system that includes components distributed among one or more server systems that perform various functions. Thus, the disclosure is not limited to executing on any particular system or group of systems. Further, aspects may be implemented in software, hardware or firmware, or any combination thereof. Thus, aspects in accord with the present disclosure may be implemented within methods, acts, systems, system elements and components using a variety of hardware and software configurations, and the disclosure is not limited to any particular distributed architecture, network, or communication protocol.

FIG. 10 shows a block diagram of an illustrative computerized device 1000, in which various aspects and functions in accord with the present disclosure may be practiced. The illustrative computerized device 1000 may include one or more illustrative computerized devices 1000. The illustrative computerized devices 1000 included by the illustrative computerized device may be interconnected by, and may exchange data through, a communication network 1008. Data may be communicated via the illustrative computerized device using a wireless and/or wired network connection.

Network 1008 may include any communication network through which illustrative computerized devices 1000 may exchange data. To exchange data via network 1008, systems and/or components of the illustrative computerized device 1000 and the network 1008 may use various methods, protocols and standards including, among others, Ethernet, Wi-Fi, Bluetooth, TCP/IP, UDP, HTTP, FTP, SNMP, SMS, MMS, SS7, JSON, XML, REST, SOAP, RMI, DCOM, and/or Web Services, without limitation. To ensure data transfer is secure, the systems and/or modules of the illustrative computerized device 1000 may transmit data via the network 1008 using a variety of security measures including TSL, SSL, or VPN, among other security techniques. The illustrative computerized device 1000 may include any number of illustrative computerized devices 1000 and/or components, which may be networked using virtually any medium and communication protocol or combination of protocols.

Various aspects and functions in accord with the present disclosure may be implemented as specialized hardware or software executing in one or more illustrative computerized devices 1000, including an illustrative computerized device 1000 shown in FIG. 10. As depicted, the illustrative computerized device 1000 may include a processor 1010, memory 1012, a bus 1014 or other internal communication system, an input/output (I/O) interface 1016, a storage system 1018, and/or a network communication device 1020. Additional devices 1022 may be selectively connected to the computerized device via the bus 1014. Processor 1010, which may include one or more microprocessors or other types of controllers, can perform a series of instructions that result in manipulated data. Processor 1010 may be a commercially available processor such as an ARM, x86, Intel Core, Intel Pentium, Motorola PowerPC, SGI MIPS, Sun UltraSPARC, or Hewlett-Packard PA-RISC processor, but may be any type of processor or controller as many other processors and controllers are available. As shown, processor 1010 may be connected to other system elements, including a memory 1012, by bus 1014.

The illustrative computerized device 1000 may also include a network communication device 1020. The network communication device 1020 may receive data from other components of the computerized device to be communicated with servers 1032, databases 1034, smart phones 1036, and/or other computerized devices 1038 via a network 1008. The communication of data may optionally be performed wirelessly. More specifically, without limitation, the network communication device 1020 may communicate and relay information from one or more components of the illustrative computerized device 1000, or other devices and/or components connected to the computerized device 1000, to additional connected devices 1032, 1034, 1036, and/or 1038. Connected devices are intended to include, without limitation, data servers, additional computerized devices, mobile computing devices, smart phones, tablet computers, and other electronic devices that may communicate digitally with another device. In one example, the illustrative computerized device 1000 may be used as a server to analyze and communicate data between connected devices.

The illustrative computerized device 1000 may communicate with one or more connected devices via a communications network 1008. The computerized device 1000 may communicate over the network 1008 by using its network communication device 1020. More specifically, the network communication device 1020 of the computerized device 1000 may communicate with the network communication devices or network controllers of the connected devices. The network 1008 may be, for example, the internet. As another example, the network 1008 may be a WLAN. However, skilled artisans will appreciate additional networks to be included within the scope of this disclosure, such as intranets, local area networks, wide area networks, peer-to-peer networks, and various other network formats. Additionally, the illustrative computerized device 1000 and/or connected devices 1032, 1034, 1036, and/or 1038 may communicate over the network 1008 via a wired, wireless, or other connection, without limitation.

Memory 1012 may be used for storing programs and/or data during operation of the illustrative computerized device 1000. Thus, memory 1012 may be a relatively high performance, volatile, random access memory such as a dynamic random-access memory (DRAM) or static memory (SRAM). However, memory 1012 may include any device for storing data, such as a disk drive or other non-volatile storage device. Various embodiments in accord with the present disclosure can organize memory 1012 into particularized and, in some cases, unique structures to perform the aspects and functions of this disclosure.

Components of illustrative computerized device 1000 may be coupled by an interconnection element such as bus 1014. Bus 1014 may include one or more physical busses (for example, busses between components that are integrated within a same machine), but may include any communication coupling between system elements including specialized or standard computing bus technologies such as USB, Thunderbolt, SATA, FireWire, IDE, SCSI, PCI, and InfiniBand. Thus, bus 1014 may enable communications (for example, data and instructions) to be exchanged between system components of the illustrative computerized device 1000.

The illustrative computerized device 1000 also may include one or more interface devices 1016 such as input devices, output devices and combination input/output devices. Interface devices 1016 may receive input or provide output. More particularly, output devices may render information for external presentation. Input devices may accept information from external sources. Examples of interface devices include, among others, keyboards, bar code scanners, mouse devices, trackballs, magnetic strip readers, microphones, touch screens, printing devices, display screens, speakers, network interface cards, etc. The interface devices 1016 allow the illustrative computerized device 1000 to exchange information and communicate with external entities, such as users and other systems.

Storage system 1018 may include a computer readable and writeable nonvolatile storage medium in which instructions can be stored that define a program to be executed by the processor. Storage system 1018 also may include information that is recorded, on or in, the medium, and this information may be processed by the program. More specifically, the information may be stored in one or more data structures specifically configured to conserve storage space or increase data exchange performance. The instructions may be persistently stored as encoded bits or signals, and the instructions may cause a processor to perform any of the functions described by the encoded bits or signals. The medium may, for example, be optical disk, magnetic disk, or flash memory, among others. In operation, processor 1010 or some other controller may cause data to be read from the nonvolatile recording medium into another memory, such as the memory 1012, that allows for faster access to the information by the processor than does the storage medium included in the storage system 1018. The memory may be located in storage system 1018 or in memory 1012. Processor 1010 may manipulate the data within memory 1012, and then copy the data to the medium associated with the storage system 1018 after processing is completed. A variety of components may manage data movement between the medium and integrated circuit memory element and does not limit the disclosure. Further, the disclosure is not limited to a particular memory system or storage system.

Although the above-described illustrative computerized device is shown by way of example as one type of illustrative computerized device upon which various aspects and functions in accord with the present disclosure may be practiced, aspects of the disclosure are not limited to being implemented on the illustrative computerized device 1000 as shown in FIG. 10. Various aspects and functions in accord with the present disclosure may be practiced on one or more computers having components other than that shown in FIG. 10. For instance, the illustrative computerized device 1000 may include specially programmed, special-purpose hardware, such as for example, an application-specific integrated circuit (ASIC) tailored to perform a particular operation disclosed in this example. While another embodiment may perform essentially the same function using several general-purpose computing devices running Windows, Linux, Unix, Android, iOS, MAC OS X, or other operating systems on the aforementioned processors and/or specialized computing devices running proprietary hardware and operating systems.

The illustrative computerized device 1000 may include an operating system that manages at least a portion of the hardware elements included in illustrative computerized device 1000. A processor or controller, such as processor 1010, may execute an operating system which may be, among others, an operating system, one of the above-mentioned operating systems, one of many Linux-based operating system distributions, a UNIX operating system, or another operating system that would be apparent to skilled artisans. Many other operating systems may be used, and embodiments are not limited to any particular operating system.

The processor and operating system may work together define a computing platform for which application programs in high-level programming languages may be written. These component applications may be executable, intermediate (for example, C#or JAVA bytecode) or interpreted code which communicate over a communication network (for example, the Internet) using a communication protocol (for example, TCP/IP). Similarly, aspects in accord with the present disclosure may be implemented using an object-oriented programming language, such as JAVA, C, C++, C#, Python, PHP, Visual Basic .NET, JavaScript, Perl, Ruby, Delphi/Object Pascal, Visual Basic, Objective-C, Swift, MATLAB, PL/SQL, OpenEdge ABL, R, Fortran or other languages that would be apparent to skilled artisans. Other object-oriented programming languages may also be used. Alternatively, assembly, procedural, scripting, or logical programming languages may be used.

Additionally, various aspects and functions in accord with the present disclosure may be implemented in a non-programmed environment (for example, documents created in HTML5, HTML, XML, CSS, JavaScript, or other format that, when viewed in a window of a browser program, render aspects of a graphical-user interface, or perform other functions). Further, various embodiments in accord with the present disclosure may be implemented as programmed or non-programmed elements, or any combination thereof. For example, a web page may be implemented using HTML while a data object called from within the web page may be written in C++. Thus, the disclosure is not limited to a specific programming language and any suitable programming language could also be used.

An illustrative computerized device included within an embodiment may perform functions outside the scope of the disclosure. For instance, aspects of the system may be implemented using an existing commercial product, such as, for example, Database Management Systems such as a SQL Server available from Microsoft of Redmond, Wash., Oracle Database or MySQL from Oracle of Redwood City, Calif., or integration software such as WebSphere middleware from IBM of Armonk, N.Y.

In operation, a method may be provided for creating photographs, videos, and live streams of one or more assets sourced from different geographic locations. Those of skill in the art will appreciate that the following methods are provided to illustrate embodiments of the disclosure and should not be viewed as limiting the disclosure to only those methods or aspects. Skilled artisans will appreciate additional methods within the scope and spirit of the disclosure for performing the operations provided by the examples below after having the benefit of this disclosure. Such additional methods are intended to be included by this disclosure.

In one embodiment, the parsing of source media may be performed with enhanced efficacy and efficiency via identifying a background layer and making assumptions that the assets such as people inherently in self-taken portraits, also known as "selfies", are the foreground of the source media. This parsing approach may advantageously allow a computerized algorithm to account for people holding objects, wearing baggy clothing, wearing hats, or otherwise appearing in a variation from a forward-facing isolated person.

While parsing source media, the media parsing component may determine foreground object scale. For example, the media parsing component may provide for an operator to manually adjust the scale of the foreground layer and advantageously control and/or fine tune the scale manually.

An example parsing operation that may be performed by the media parsing component will now be discussed, without limitation. For the purpose of this example, various user types will be discussed. As used in this example, an Origin User may include the user that will be creating the output media product from source media of themselves and others. As used in this example, a Remote User may include one or more users that can be superimposed into the Origin User's picture or other source media.

In this example, the Origin User may open the application and start a photo session. The Origin User may invite multiple Remote Users to join the photo session. This invitation may be assisted by the permissions component. Once a sufficient number of the parties have joined and opened an interface of the audiovisual media composition system, a live video feed from the Remote User cameras may be analyzed and the background layer may be removed. The live video feed from the Remote Users may be superimposed onto the Origin User's camera view. In one embodiment, the Origin User may position and move each Remote User's input on their camera view. The Origin User may use a slider to adjust the scale of each remote user input to account for discrepancies in distance from camera lens. The Origin User may selectively save the created media output product, for example, hybrid photograph.

Various media transformation techniques may be used to modify the parsed assets and/or source media. Some illustrative media transformation techniques will now be discussed, without limitation. Poisson blending may be used to give a natural appearance for superimposed Remote User inputs, which may be used to smooth out rough edges of the Remote User's input and give a more natural appearance to the output media product. Gaussian mixture-based background and/or foreground segmentation algorithms may be used to separate the foreground from the background in a live video feed. Line-by-Line subject identification may be used to apply a 3D model to understand the elements of the audiovisual media. 3D techniques may be used for placement in the frame and multiple camera inputs. 3D object and image isolation may facilitate saving example jpg and 3D model files. 3D model creation and placement of images on a 3D model from a single or multiple camera component may assist with transforming the image angle or other parameters.

Subject separation from background may use a 3D model to understand distance and objects of the audiovisual media, Depth sensing may be used to understand the elements of the audiovisual media. Subject normalization may be applied to improve consistency of focus, color, shadow, depth, exposure, etc. Subject normalization may advantageously fix and/or improve the similarity of audiovisual media.

Audio visual media may be merged and/or matched to solve movement and stabilization. 2D pictures or 3D models may be inserted into the media product by substantially automatically tracking nearby reference points. Merging and layering techniques may be used for audio tracks. Sound normalization and cleanup may be used for merged audiovisual output, which may be accomplished using synced multi-channel audio and/or video.

Shadows may be cleaned up, for example, if inconsistent. Artificial light sources may be added to improve consistency of the parsed assets. Shadow may also be suppressed to assist with illumination robust face recognition. Live preview depth sensing feedback may be used to assist with frame a shot used to create the source media.

An illustrative user story will now be discussed to provide an example of a user interaction with a system enabled by this disclosure. Those of skill in the art will appreciate that this example is not intended to be the only way to interact with such a system and does not limit inclusion of additional user experiences.

In this example, a user may interact with the example system for a first time. Given the example user has not registered, they may be presented with a registration screen. Users may login with Google, Facebook, email, and/or other credentials. The example user may be prompted upon registration to validate email address with a token. On the initial login, the user may be presented with a screen to import from a phone contact list to populate their friends list.

The user may login to the example system. Given a user has registered, then they may login to their account. The login screen may cycle through publicly shared output photograph products from other users.

Viewing a main screen of the app, the user may locate the camera module. With the camera module, the user may frame the image or video, which may be used to provide live video preview. A live video preview may be provided via the interface. For example, to enable two people to see each other and to pose for a photo or capture a video clip, the live video preview may allow users to adjust and frame the image(s) in substantially real-time. Adjustments my include a distance measure to ensure the subjects are the same distance away from the device's camera module. The software may affect the selection of camera modules with the similar F-stop, lens type, and other specifications. Differing camera specifications may optionally be corrected and/or modified from the source media. Each subject may capture a frame of the live video for a picture or a clip to record a video.

The user may access a friends list. A user may make an audiovisual source media to select another user to collaborate with. Selection may be made on the list and the user that has been selected is notified of the request via the interface. The person receiving the notification may accept or decline the request. If declined they can send an optional message via the same pop-up window.

A gallery page may show output media products on local storage and/or networked storage. The user may see output media products previously taken as well as the status of post processing work of audiovisual media. The user may also select an output media product to share with a user or to a platform, such as a social media platform.

Figure 11:
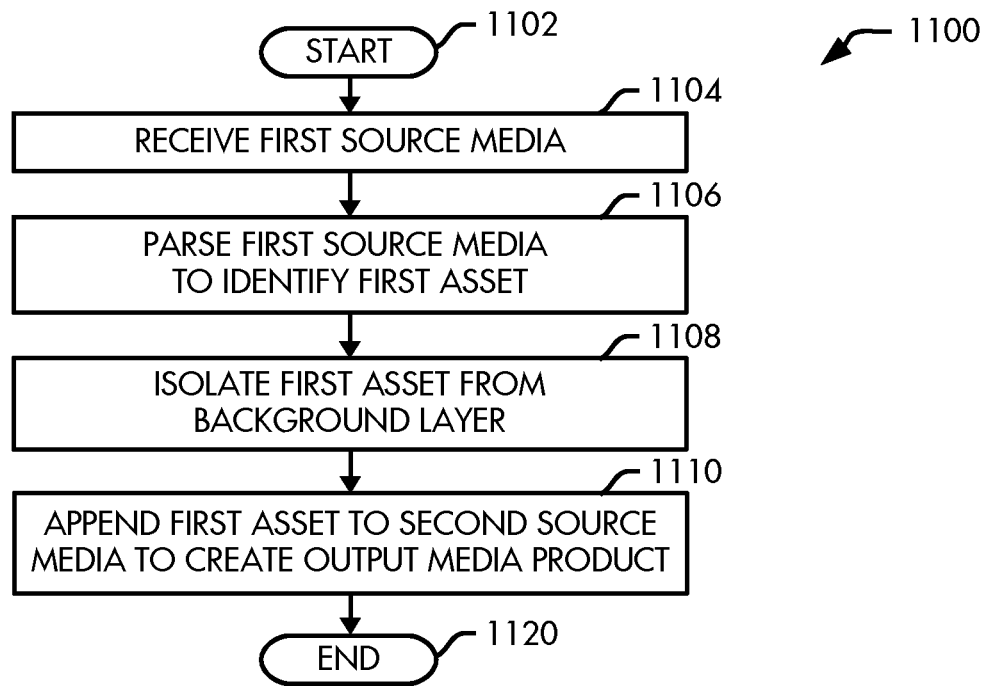
FIG. 11 is a flowchart view of an illustrative composition operation, according to an embodiment of this disclosure.

Referring now to flowchart 1100 of FIG. 11, an example method for an illustrative composition operation will be described, without limitation. Starting with Block 1102, the operation may begin by receiving first source media. (Block 1104). The operation may parse the first source media to identify a first asset. (Block 1106). The first asset may then be isolated from a background layer and/or other undesired content of the first source media. (Block 1108). The first asset may then be appended to the second source media to create the output media product. (Block 1110). The operation may then terminate at Block 1120.

Figure 12:
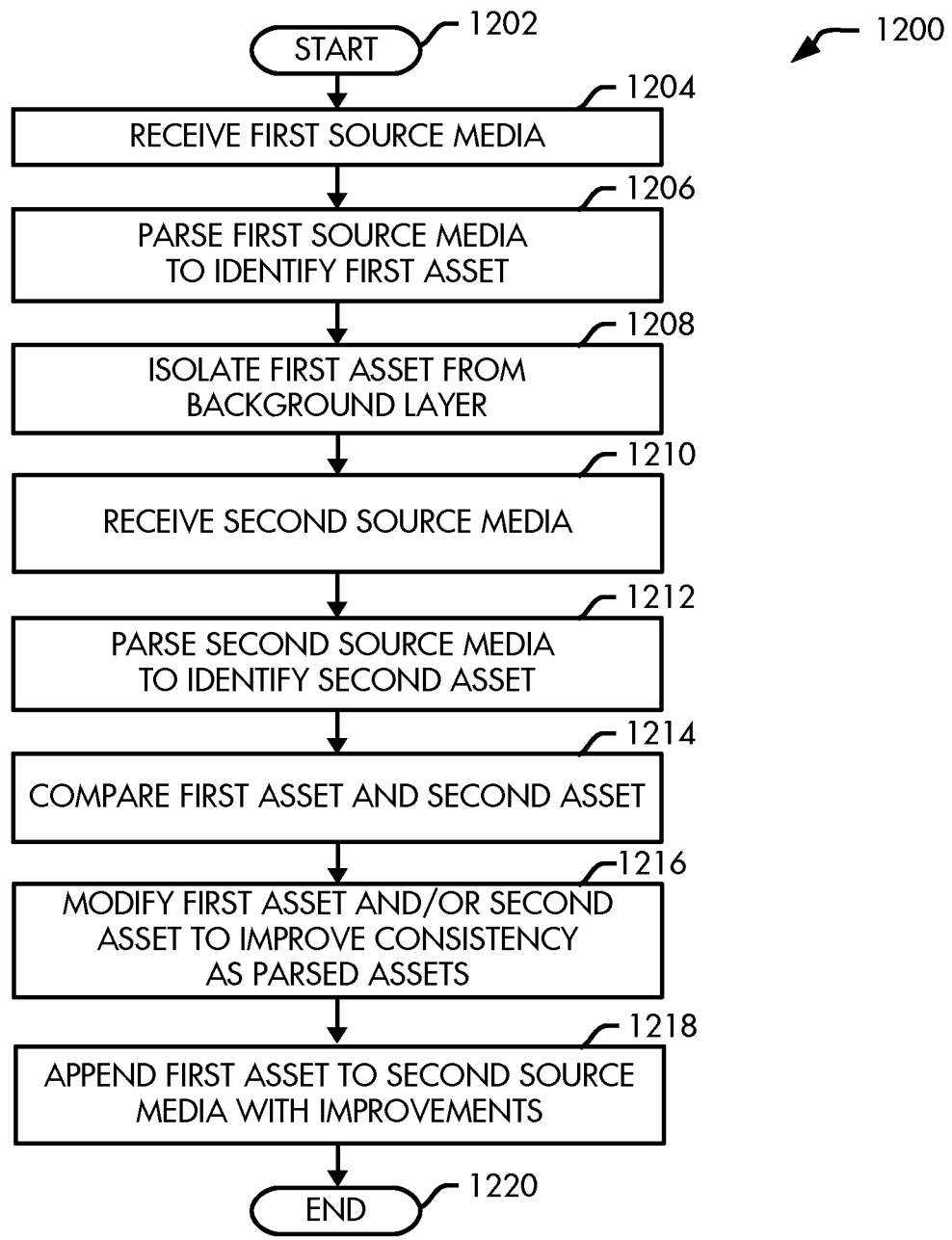
FIG. 12 is a flowchart view of an illustrative composition operation with improvement features, according to an embodiment of this disclosure.

Referring now to flowchart 1200 of FIG. 12, an example method for an illustrative composition operation with improvement features will be described, without limitation. Starting with Block 1202, the operation may begin by receiving first source media. (Block 1204). The operation may parse the first source media to identify a first asset. (Block 1206). The first asset may then be isolated from a background layer and/or other undesired content of the first source media. (Block 1208).

The operation may then receive second source media. (Block 1210). Skilled artisans will appreciate that the first and second source media may be received in any order and/or substantially simultaneously. The operation may parse the second source media to identify a second asset. (Block 1212). The operation may then compare the first asset and the second asset, for example, to establish formatting similarities and irregularities. (Block 1214). The first asset may be modified to improve consistency with the second asset, which may be included as parsed assets. (Block 1216). Skilled artisans will appreciate an alternative embodiment wherein the second asset is alternatively or additionally modified, which is intended to be within the scope of this disclosure. The first asset may then be appended to the second source media with the improvements to create the output media product. (Block 1218). The operation may then terminate at Block 1220.

Figure 13:
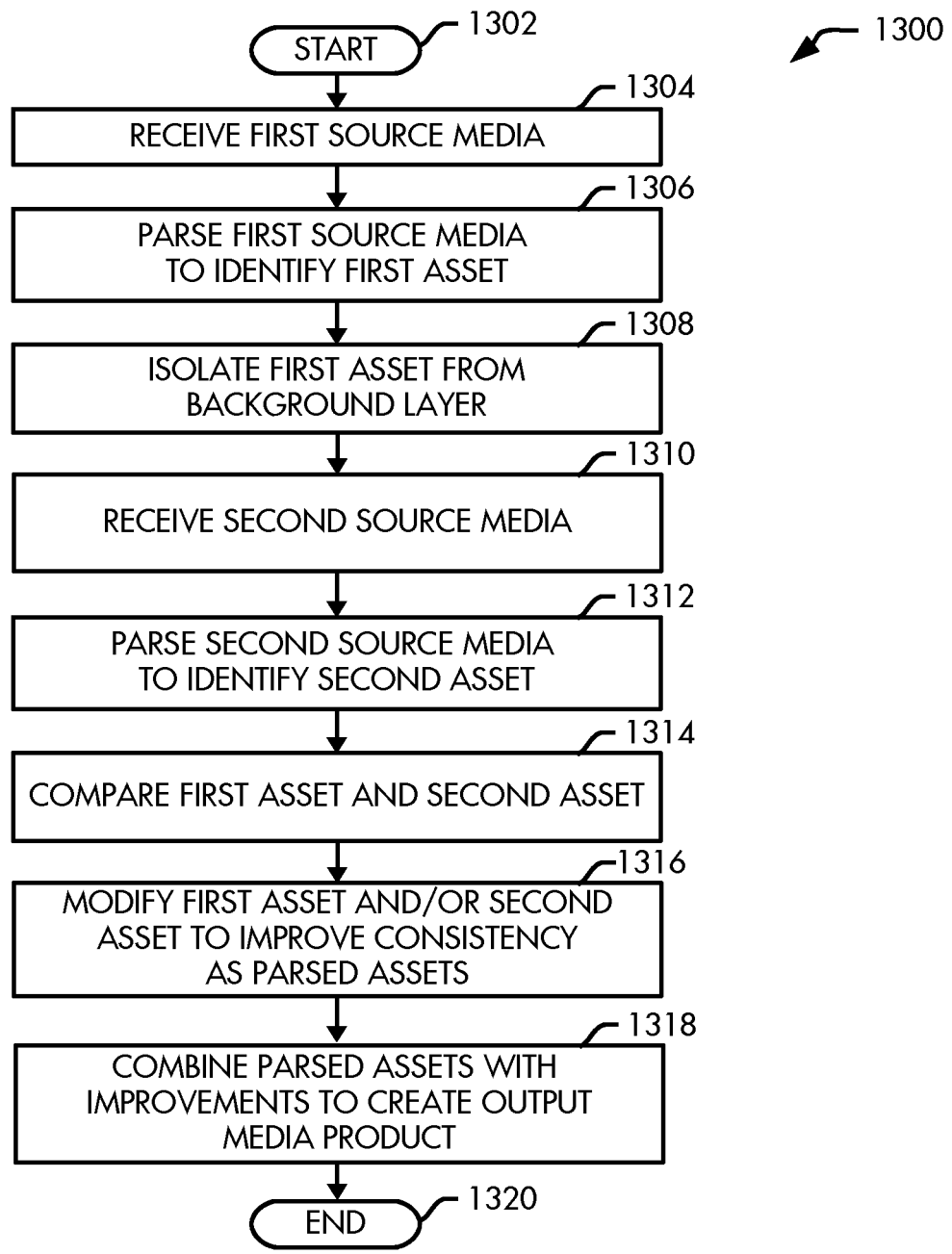
FIG. 13 is a flowchart view of an illustrative video composition operation, according to an embodiment of this disclosure.

Referring now to flowchart 1300 of FIG. 13, an example method for an illustrative video composition operation will be described, without limitation. Starting with Block 1302, the operation may begin by receiving first video source media. (Block 1304). The operation may parse the first video source media to identify a first asset. (Block 1306). The first asset may then be isolated from a background layer and/or undesired content of the first video. (Block 1308). The first asset may also be tracked.

The operation may then receive second video source media. (Block 1310). Skilled artisans will appreciate that the first and second video source media may be received in any order and/or substantially simultaneously. The operation may parse the second video source media to identify a second asset. (Block 1312). The operation may then compare the first asset and the second asset, for example, to establish formatting similarities and irregularities. (Block 1314). The first asset and/or the second asset may be modified to improve consistency and be included as the parsed assets. (Block 1316). Skilled artisans will appreciate an alternative embodiment wherein the second asset is alternatively or additionally modified, which is intended to be within the scope of this disclosure. The parsed assets may then be combined with the improvements to create the output media product (Block 1318). The operation may then terminate at Block 1320.

Figure 14:
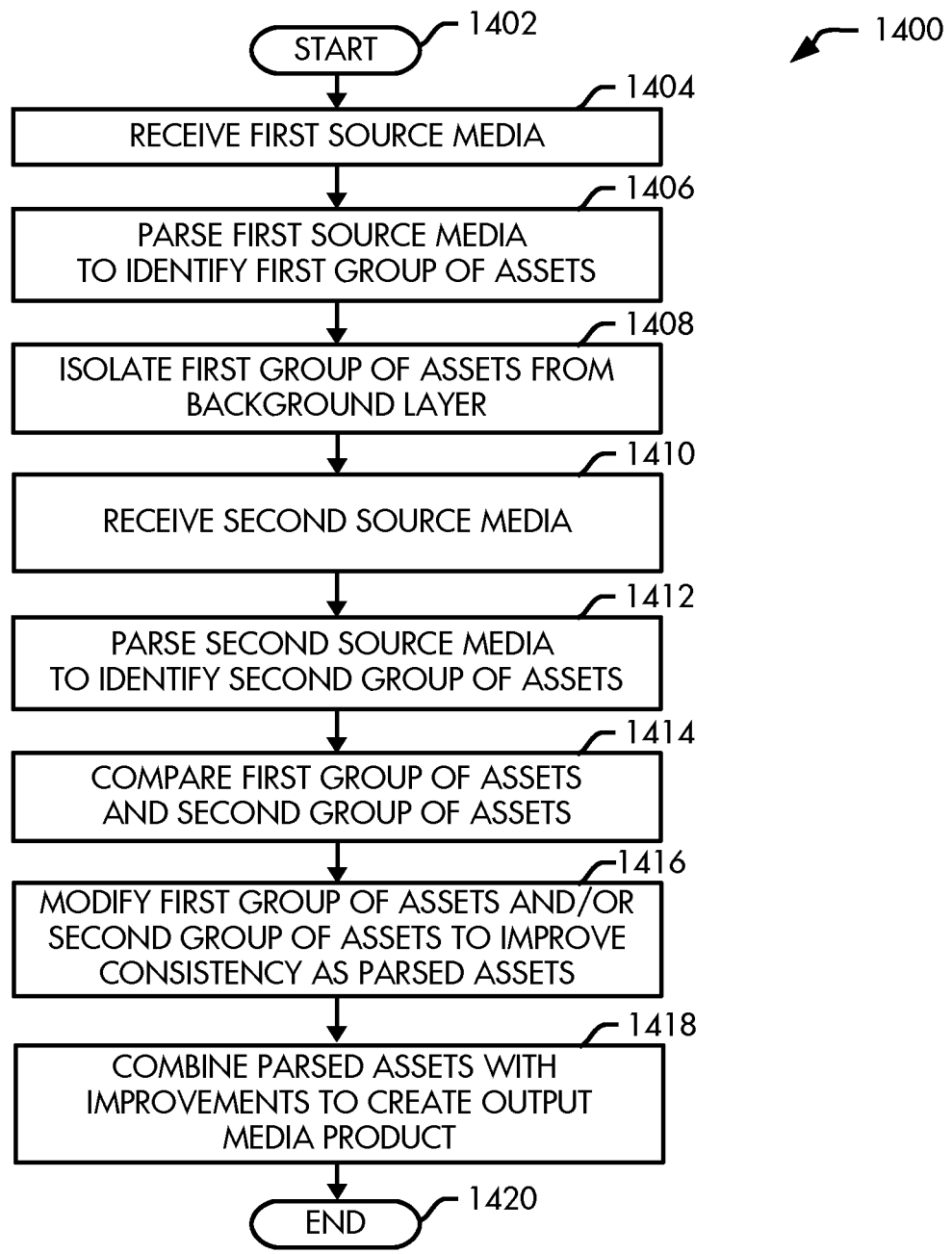
FIG. 14 is a flowchart view of an illustrative composition operation for groups of assets, according to an embodiment of this disclosure.

Referring now to flowchart 1400 of FIG. 14, an example method for an illustrative composition operation for groups of assets will be described, without limitation. Starting with Block 1402, the operation may begin by receiving first source media. (Block 1404). The operation may parse the first source media to identify a first group of assets. (Block 1406). The first group of assets may then be isolated from a background layer and/or other undesired content of the first image. (Block 1408).

The operation may then receive second media. (Block 1410). Skilled artisans will appreciate that the first and second source media may be received in any order and/or substantially simultaneously. The operation may parse the second source media to identify a second group of assets. (Block 1412). The operation may then compare the first group of assets and the second group of assets, for example, to establish formatting similarities and irregularities. (Block 1414). The first group of assets and/or the second group of assets may be modified to improve consistency and be included as parsed assets. (Block 1416). Skilled artisans will appreciate an alternative embodiment wherein the second group of assets is alternatively or additionally modified, which is intended to be within the scope of this disclosure. The parsed assets may then be combined with the improvements to create the output media product. (Block 1418). The operation may then terminate at Block 1420. This operation may additionally apply to video content, without limitation.

Figure 15:
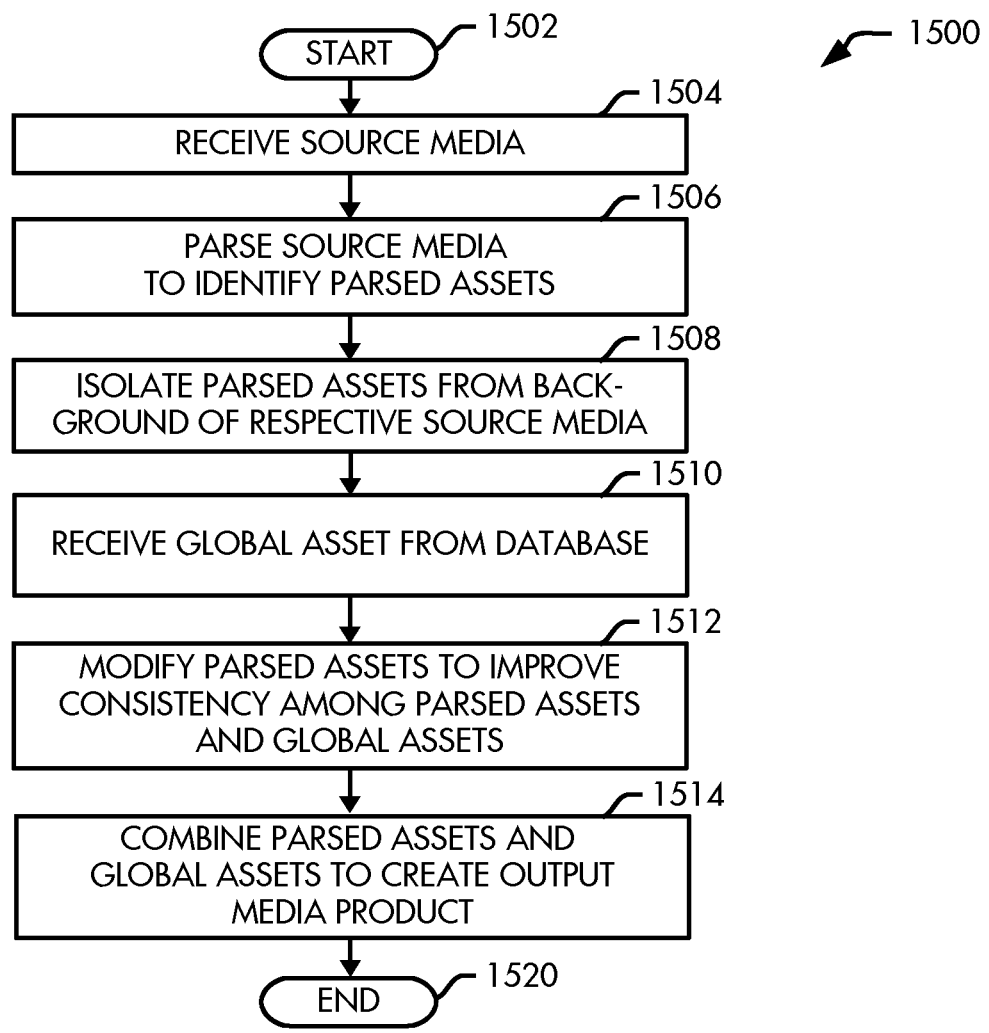
FIG. 15 is a flowchart view of an illustrative composition operation with a simulated background, according to an embodiment of this disclosure.

Referring now to flowchart 1500 of FIG. 15, an example method for an illustrative composition operation with a simulated background will be described, without limitation. Starting with Block 1502, the operation may begin by receiving source media. (Block 1504). The source media may include one or more media sources. The operation may parse the first image to identify first source media. The operation may optionally receive second source media. Skilled artisans will appreciate that the first and second source media may be received in any order and/or substantially simultaneously. The assets parsed from the source media may be include as parsed assets. (Block 1506). The parsed asset may then be isolated from one or more background layer and/or other undesired content of the first image. (Block 1508).

The operation may then retrieve one or more global assets, such as from a database. (Block 1510). An example global asset may include a stock background layer. The parsed assets may be compared with one another and/or the global assets, one or more of which may be modified, for example, to correct and/or affect formatting similarities and irregularities. (Block 1512). The parsed assets and/or the global assets may then be combined with the improvements to create the output media product. (Block 1514). The operation may then terminate at Block 1520. The desired background may be a famous or other desired location, for example, that is different than the background of the first or second source images. This operation may additionally apply to video content.

Figure 16:
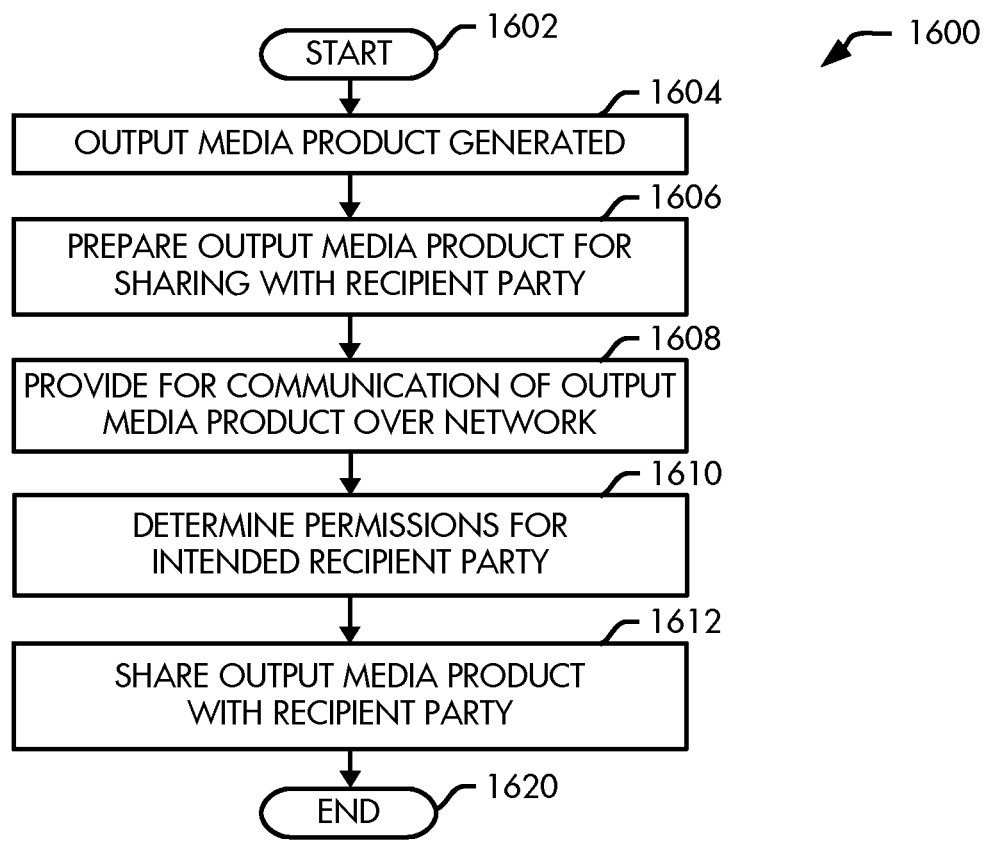
FIG. 16 is a flowchart view of an illustrative audiovisual media product sharing operation, according to an embodiment of this disclosure.

Referring now to flowchart 1600 of FIG. 16, an example method for an illustrative audiovisual media product sharing operation will be described, without limitation. Starting with Block 1602, the operation may begin with retrieving or otherwise selecting the output media product, such as may be generated by one or more of the operations discussed above. (Block 1604). The output media product may be prepared for sharing with a recipient party. (Block 1606). The operation may provide for communication of the output media product over a network, such as the Internet. (Block 1608). In at least one embodiment, the photography product may be shared over an application or social network via the Internet. It may then be determined whether the indicated recipient party and/or recipient destination is permitted to receive the output media product. (Block 1610). Recipient parties may include the public, social media platform, specified individuals, groups of persons, and other designations as would be appreciated by those of skill in the art after having the benefit of this disclosure. The output media product may then be shared with the users and/or other desired recipient parties. (Block 1612). The operation may then terminate at Block 1620.

While various aspects have been described in the above disclosure, the description of this disclosure is intended to illustrate and not limit the scope of the invention. The invention is defined by the scope of the appended claims and not the illustrations and examples provided in the above disclosure. Skilled artisans will appreciate additional aspects of the invention, which may be realized in alternative embodiments, after having the benefit of the above disclosure. Other aspects, advantages, embodiments, and modifications are within the scope of the following claims.

What is claimed is:

1. A media creation system comprising a non-transitory computer readable medium, excluding transitory signal transmission, and comprising instructions that, in response to execution, cause the system comprising a processor to perform operations comprising:
    deriving parsed assets from source media via a media parsing component and storing the parsed assets in memory, the source media comprising at least a first source media created by a first user from which a first parsed asset is derived and a second source media created by a second user from which a second parsed asset is derived;
    organizing the parsed assets in the memory via a transposition component and composing an output media product comprising each of the parsed assets without the parsed assets being combined with one another beyond being presented in the same output media product; and
    sharing at least the output media product with a recipient party using a communication component via a network when the processor completes processing the output media product and without intentional delay.

2. The system of claim 1:
    wherein the transposition component at least partially modifies the parsed assets to simulate being originated from a common source medium prior to being transposed into the output media product;
    wherein the output media product simulates at least the first parsed asset and the second parsed asset being originated from the common source medium; and
    wherein the output media product simulates being originated from the common source medium with the parsed assets present at a shared location.

3. The system of claim 1,
    wherein a permissions component comprising permission rules allows access to at least the output media product to the recipient party in compliance with the permission rules.

4. The system of claim 1, further comprising:
    a database communicably connected to the communication component via the network;
    wherein the output media product is storable by the communication component in the database via the network; and
    wherein the output media product is retrievable by the recipient party from the database via the network.

5. The system of claim 4, further comprising:
    global assets storable in the database; and
    wherein the global assets are selectively included with the parsed assets to compose the output media product.

6. The system of claim 5, wherein the global assets include a location background layer.

7. The system of claim 1, further comprising:
    a camera component to originate the source media; and wherein the source media originated by the camera component is stored in the memory to be retrieved by the media parsing component.

8. The system of claim 1:
wherein the first source media is originated from a first geographic location comprising the first parsed asset;
wherein the second source media is originated from a second geographic location comprising the second parsed asset;
wherein the transposition component analyzes the first parsed asset and the second parsed asset; and
wherein the transposition component composes the output media product to comprise the first parsed asset and the second parsed asset.

9. The system of claim 1, wherein the source media comprises an image.

10. The system of claim 1, wherein the source media comprises video and audio.

11. The system of claim 10, wherein the video and the audio are captured without intentional delay;
wherein the video and the audio are processed by the processor upon receipt; and
wherein the output media product is shared with the recipient party when the processor completes processing the video and the audio and without intentional delay.

12. A non-transitory computer-readable medium, excluding transitory signal transmission, and comprising instructions that, in response to execution, cause a system comprising a processor to create media creation system by performing the operations comprising:
operating a media parsing component to derive parsed assets from source media and store the parsed assets in memory, the source media comprising:
first source media comprising a first asset, and
second source media comprising a second asset;
operating a transposition component to organize the parsed assets in the memory upon receipt of the parsed assets from the media parsing component and compose an output media product comprising each of the parsed assets without the parsed assets being combined with one another beyond being presented in the same output media product;
operating a permissions component comprising permission rules; and
accessing a database via a network, wherein the output media product is storable in the database;
wherein operating the transposition component performs the steps of:
(a) analyzing the first asset and the second asset,
(b) composing the output media product to comprise the first asset and the second asset, and
(c) at least partially modifying the first asset and/or the second asset to simulate being originated from a common source medium prior to being transposed into the output media product;
wherein operating the output media product simulates being originated from the common source medium with at least the first asset and the second asset present at a shared location;
wherein operating the permissions component allows access to at least the output media product to a recipient party in compliance with the permission rules; and
wherein the output media product is retrievable by the recipient party in compliance with the permission rules from the database when the processor completes processing the output media product and without intentional delay.

13. The non-transitory computer-readable medium, excluding transitory signal transmission, of claim 12,
wherein global assets are storable in the database and are includable with the parsed assets to compose the output media product.

14. The non-transitory computer-readable medium, excluding transitory signal transmission, of claim 12,
wherein the source media originated by a camera component is stored in the memory to be retrieved by the media parsing component.

15. The non-transitory computer-readable medium, excluding transitory signal transmission, of claim 12,
wherein the database is communicably connected to the network via a communication component being a software module configured to operate on the at least one computerized device to cause the one or more computers to share at least the output media product with the recipient party via the network when the processor completes processing the output media product and without intentional delay.

16. A method of composing an output media product using parsed assets comprising:
(a) deriving the parsed assets from source media and storing the parsed assets in memory, the source media comprising at least a first source media from which a first parsed asset is derived and a second source media from which a second parsed asset is derived;
(b) organizing the parsed assets in the memory and composing an output media product comprising the parsed assets;
(c) a least partially modifying the parsed assets to simulate being originated from a common source medium prior to being transposed into the output media product; and
(d) sharing at least the output media product with a recipient party over a network when processing of the output media product completes and without intentional delay;
wherein the output media product simulates being originated from the common source medium by simulating the parsed assets being present at a shared location.

17. The method of claim 16, further comprising:
(e) allowing access to at least the output media product to the recipient party in compliance with permission rules.

18. The method of claim 16, further comprising the steps:
(f) storing the output media product in a database via the network;
(g) retrieving the output media product by the recipient party from the database;
wherein global assets are storable in the database; and
wherein the global assets are includable with the parsed assets to compose the output media product.

19. The method of claim 16, wherein the source media comprises:
first source media originated at a first geographic location comprising a first asset;
second source media originated at a second geographic location comprising a second asset;
the method further comprising:
(h) analyzing the first asset and the second asset;
(i) composing the output media product to comprise the first asset and the second asset as the parsed assets without the parsed assets being combined with one another beyond being presented in the same output media product; and (j) at least partially modifying the first asset and/or the second asset to simulate being originated from the common source medium prior to being transposed into the output media product.

20. The method of claim 16, wherein the output media product comprises images.

* * * * *